United States Patent [19]

Stevenson et al.

[11] 3,966,601

[45] June 29, 1976

[54] EFFLUENT TREATMENT

[75] Inventors: Arthur Stevenson, West Bromwich; Neil Harkness, Lichfield, both of England

[73] Assignee: Robinson Brothers Ltd., West Bromwich, England

[22] Filed: Oct. 11, 1973

[21] Appl. No.: 405,476

[30] Foreign Application Priority Data

Nov. 1, 1972 United Kingdom............... 50349/72

[52] U.S. Cl. ................................................. 210/53
[51] Int. Cl.² .......................................... C02C 5/02
[58] Field of Search .................. 210/54, 55, 53, 52, 210/51, 42; 260/513.5; 423/366

[56] References Cited
UNITED STATES PATENTS

| | | | |
|---|---|---|---|
| 1,972,961 | 9/1934 | Tisdale et al. | 260/513.5 |
| 2,426,586 | 9/1947 | Beber | 260/513.5 |
| 3,516,932 | 6/1970 | Hedrick et al. | 210/53 |

FOREIGN PATENTS OR APPLICATIONS

| | | | |
|---|---|---|---|
| 496,683 | 10/1953 | Canada | 260/513.5 |

*Primary Examiner*—Thomas G. Wyse
*Attorney, Agent, or Firm*—Hammond & Littell

[57] ABSTRACT

A purification process for industrial effluent containing dissolved dithiocarbamate is described. Before discharging the effluent, it is mixed at pH 6 to 8 with a soluble heavy metal salt and heavy metal dithiocarbamate thereby precipitated and the precipitate is separated from the effluent. By the process poisoning of fish in water courses into which the effluents are discharged can be avoided as can malfunctioning of sewage treatment processes handling the effluents.

15 Claims, No Drawings

EFFLUENT TREATMENT

Dithiocarbamates are made on a considerable scale and widely used and thus they and related compounds tend to be present in some industrial effluents. This is true both of places where dithiocarbamates are made and places where they are used e.g. in making agricultural fungicides and in the rubber industry.

Industrial effluents containing dithiocarbamates have long been discharged and it has commonly been thought that this is a tolerable situation in view of the relatively low proportion of dithiocarbamates even in dithiocarbamate-rich industrial effluents, in view of the dilution of such effluents when discharged into water courses or when mixed with other effluents and in view of the possibility of decomposition. We, however have found that, surprisingly, deliberate purification of industrial effluents containing dithiocarbamates is, in fact, very necessary before discharge if the discharge of such effluents is to be satisfactory. Thus, although dithiocarbamates are of quite low toxicity to mammals and birds, we have found that, surprisingly, water-soluble dithiocarbamates are very highly toxic to fish, they have a significant and undesirable inhibiting action on the nitrification bacteria whose action is valuable in sewage treatment and they are very toxic to grazing fauna that play a vital part in controlling fungal growth in bacterial sewage beds.

Water-soluble dithiocarbamate is not biologically degraded in sewage treatment processes and thus, if present in the matter to be treated by such a process, will also be present in the treated effluent discharged and will therefore be liable to poison any fish in the water course into which the treated effluent is discharged. Naturally, if, as is sometimes the case, effluent containing dissolved dithiocarbamate is discharged directly into a water course rather than into a sewer there is also the risk that any fish in the water course will be poisoned irrespective of any subsequent treatment of the water in the water course.

The seriousness of the hazard to fish is shown by the following facts. A manufacturing plant producing or handling dithiocarbamates may easily yield an effluent stream containing 200 p.p.m. of dissolved dithiocarbamate (expressed as carbon disulphide). A typical water-soluble dithiocarbamate, sodium dimethyl dithiocarbamate, has, we have found, a $LC_{50}$ in water of 0.08 p.p.m. (expressed as carbon disulphide) on rainbow trout over a 48 hour period. Accordingly, even if the dithiocarbamate-containing effluent forms only 1/2,500 of the total volume of effluent treated by a sewage treatment process the above $LC_{50}$ figure will be reached in the treated effluent discharged and thus there will be a very significant hazard to fish in the water course into which the treated effluent is discharged.

The nitrification bacteria useful in sewage treatment processes might become acclimatised to the presence of dissolved dithiocarbamate, at rather lower levels than 200 p.p.m. (expressed as carbon disulphide), in effluents but acclimatisation of bacteria to inhibitors is a process which takes some time and generally the bacteria cannot cope satisfactorily with the fluctuations in dissolved dithiocarbamate content of effluents containing such dithiocarbamate.

For bacterial sewage beds to function properly, the conditions must enable the effective bacteria to flourish and various factors affect this, in particular the growth of fungi on the filter beds. Certain fibrous fungi tend to grow on filter beds and, if the growth of these is not controlled, they cover the filter medium and create anaerobic conditions under which the bacteria are ineffective. When functioning properly however, the filter beds support a population of grazing fauna and these include, importantly white enchyntrae worms (lumbricillus rivalis) which normally feed on, and control the growth of, the fibrous fungi. We have found that sodium dimethyl dithiocarbamate has a $LC_{50}$ in water of 0.8 p.p.m. (expressed as carbon disulphide) on lumbricillus rivalis over a 48 hour period. Accordingly, the proper functioning of a sewage treatment process may be seriously impaired if a typical dithiocarbamate-containing industrial effluent forms even a very small proportion of the total volume of effluent treated.

According to the present invention, a process for purifying industrial effluent containing dissolved dithiocarbamate comprises, before discharging the effluent, mixing the effluent at a pH of 6 to 8 with soluble heavy metal salt and thereby precipitating heavy metal dithiocarbamate, separating the precipitated heavy metal dithiocarbamate from the effluent and discharging the effluent. By the term "dissolved dithiocarbamate" we include not only dissolved dithiocarbamates as such but also dissolved related compounds such as thiuram sulphides and polysulphides, trithiocarbonates and xanthates and mixtures of dissolved substances which will combine in effluents under certain pH conditions to give dissolved dithiocarbamates themselves.

We have found that it is essential that the pH of the effluent should be within the range mentioned and, if the effluent does not initially have a suitable pH, steps must be taken to bring this about e.g. addition of water-soluble basic or acidic compounds such as sodium hydroxide, sulphuric acid and hydrochloric acid. If the pH is below 6.0 acid hydrolysis of any water-soluble dithiocarbamates such as an alkali metal dithiocarbamate, or of any insoluble dithiocarbamates which may be in suspension, will occur to give free carbon disulphide and ammonium or amine salts and these will recombine if the treated effluent subsequently mixes with an alkaline discharge, which is not unlikely in an industrial area.

If the effluent to be treated is acidic it may contain dissolved dithiocarbamate in the form of carbon disulphide and an ammonium or amine salt. In this case it is desirable initially to raise the pH to rather a high value e.g. 10 or more by addition of a soluble base such as sodium hydroxide in order to ensure rapid and complete recombination of the carbon disulphide and ammonium or amine salt before the precipitation is effected at a pH of from 6 to 8.

If the pH during the precipitation is above 8.0 alkaline hydrolysis of any precipitated heavy metal dithiocarbamate will occur thereby regenerating water-soluble dithiocarbamate. Also, if the pH is too high any suspended heavy metal dithiocarbamate originally present, or precipitated in the effluent, will be converted to water-soluble dithiocarbamate and thus the process would then be positively disadvantageous.

In the process a salt of any of the heavy metals which give rise to insoluble dithiocarbamates may be used. Examples of cations of usable salts are those of $Tl^I$, $As^{III}$, $Zn^{II}$, $Fe^{III}$, $Ni^{II}$, $Cd^{II}$, $Pb^{II}$, $Co^{III}$, $Cu^{II}$, $Ag^I$ and $Hg^{II}$ and the water solubility of the dithiocarbamates of these decreases in the order listed. The nature of the anion of the salt is unimportant so long as the salt is soluble and so long as the anion is not itself an undesirable material to be present in the treated effluent. Especially suitable cations are those of iron and copper. The preferred precipitants are ferrous, ferric and cupric sulphates since these are effective, cheap and possess harmless anions. Commercial ferrous sulphate usually contains an appreciable proportion of ferric iron and this is increased by atmospheric oxidation in the treatment process but this is entirely satisfactory. Mixtures of salts may be used and different salts may be added consecutively. A preferred technique involves an initial precipitation using an iron salt followed by a final precipitation using a copper salt. By this means advantage is taken of the cheapness of suitable iron salts and of the fact that copper dithiocarbamates are less soluble than iron dithiocarbamates. By this means a very effective precipitation can be achieved but expense is minimised since instead of using solely a copper salt, which is relatively expensive, a large part of the total heavy metal salt used can be an iron salt, which is relatively cheap.

In order to facilitate rapid distribution of the precipitant throughout the effluent to be treated it is convenient to add the precipitant in the form of an aqueous solution e.g. of concentration from 10 to 20% w/v. Thorough mixing of the precipitant with the effluent is essential in order to achieve efficient precipitation and thus it is desirable to conduct the process so that such thorough mixing occurs. In the case of a batch process the effluent and precipitant solution may well be mixed in a large tank and the mixture allowed to remain there for some time. In this case efficient mixing will tend to occur without any special steps being taken. In a continuous process the precipitant should either be added in such a way that efficient mixing with the effluent stream thereby occurs and/or the mixture of effluent and precipitant should be agitated in order to ensure thorough mixing. The desired precipitation does not occur instantaneously but in either a batch or a continuous process a suitable residence time i.e. period between addition of the precipitant and separation of the treated effluent from the precipitate can easily be determined by simple experimentation for any particular case.

Although the solubility of heavy metal dithiocarbamates is such that a very high proportion of the water-soluble dithiocarbamate can easily be precipitated from the effluents it is desirable to use a flocculating agent such as a high molecular weight polyelectrolyte e.g. a polyacrylamide to aid separation of the precipitated matter. Usually the flocculating agent will be added in an amount of 1 to 2 p.p.m. based on the volume of effluent being treated and will be added as an aqueous solution after the precipitation stage. The separation itself can be effected by, for example, filtration or centrifuging. However the basic separation is preferably achieved initially by use of a settlement tank, the sludge being periodically removed and the precipitate separated from the liquid matter of the sludge by filtration or centrifuging. The separated liquid may be fed to the stream of treated effluent. In some cases, in order to ensure entirely satisfactory separation, it may be desirable to conduct the separation in two or more stages e.g. by use of two or more settlement tanks in series.

It might be thought that the separation is an unnecessary step of the process since the insoluble dithiocarbamates are not toxic to fish and the nitrification bacteria. However this step is important since if effluent containing insoluble dithiocarbamate in suspension is discharged into a water course which is alkaline or subsequently meets an alkaline discharge water-soluble, toxic dithiocarbamates will be generated. Furthermore it is desirable that the separated insoluble dithiocarbamates should be disposed of by incineration rather than by dumping since in the latter case there is always a risk of the dithiocarbamates coming into contact with alkaline material and thus being solubilised and subsequently washed into water courses by rain water.

The precipitation can be carried out batchwise but is preferably carried out continuously. Periodic removal of separated insoluble dithiocarbamate is adequate but, as the dithiocarbamate content of the effluent being treated is very small compared with the volume of effluent to be treated (total dissolved dithiocarbamate, expressed as carbon disulphide, is unlikely to exceed 2,000 p.p.m. of effluent), such removal is only needed at infrequent intervals e.g. 7 days with a process handling 30,000 gallons of effluent per day having an average dissolved dithiocarbamate content, expressed as carbon disulphide, of 500 to 700 p.p.m.

The pH of the effluent to be treated needs to be in the range already specified during the precipitation and thus needs to be measured and, if appropriate, adjusted. In a batch process a single pH measurement per batch and, if necessary, a single pH adjustment will suffice but in a continuous process the pH needs to be measured periodically or, preferably, continuously and correspondingly adjusted if appropriate. In a continuous process means for continuous pH measurement is desirably linked to means for adjusting the pH so that the pH is automatically always kept within the desired range.

The amount of dissolved dithiocarbamate in the effluent to be treated also needs to be measured and the amount of precipitant adjusted accordingly. In a batch process a single measurement per batch enables a suitable amount of precipitant to be calculated but in a continuous process the dissolved dithiocarbamate content needs to be measured periodically or, preferably, continuously and the amount of precipitant used correspondingly adjusted if necessary. Desirably, in a continuous process, means for measuring the dissolved dithiocarbamate content continuously are linked with the feed of precipitant so that the latter is automatically adjusted to the appropriate amount. Alternatively, the dissolved dithiocarbamate content of the treated effluent may be measured periodically or, preferably, continuously in a continuous process and the results linked with the precipitant feed so that the latter is automatically kept appropriate.

The amount of precipitant used is normally in excess e.g. an excess of up to 200% of the stoichiometric amount. Use of an excess helps prevent imperfect mixing of effluent and precipitant giving rise to incomplete precipitation. A suitable amount in any particular case can easily be determined by simple experimentation and will depend on the nature of the precipitant, the physical conditions e.g. degree of agitation used in the mixing and precipitation stages and, of course, the nature of the effluent to be treated. The effluent may contain soluble sulphides and in this case a suitable excess is desirable in that otherwise the sulphide would compete with dithiocarbamate for the heavy metal ions. The use of excess precipitant means that the treated effluent will generally contain dissolved heavy metal compounds. Such compounds are generally undesirable in effluents and they can be removed by conventional effluent treatment processes. For example, dissolved iron salts can be removed by raising the pH to 10 to 12 by addition of sodium or calcium hydroxide, thereby precipitating the iron as its hydroxide. An establishment yielding effluent containing dissolved dithiocarbamate will often also yield an effluent containing undesirable heavy metal compounds and thus a secondary treatment to remove such compounds is not a treatment only rendered desirable in consequence of carrying out the process of the invention using excess precipitant.

The use of excess precipitant in the process of the invention is not an uneconomical feature since, in view of the small proportions of dissolved dithiocarbamate liable to be encountered in effluents, the amount of precipitant needed is in any case small and, in particular, only a small item amongst the various necessities of the process.

The process according to the invention is applicable for all water-soluble dithiocarbamates since the heavy metal dithiocarbamates are invariably of very low solubility. Water-soluble dithiocarbamates are the alkali metal and alkaline earth metal dithiocarbamates and the dithiocarbamate moiety may carry a variety of substituents. Toxicity tests have been carried out on a variety of water-soluble dithiocarbamates and all have been found to have substantial toxicity to fish and nitrification and thus it is advantageous that the process is of general applicability. Often the effluent to be treated will contain more than one type of dissolved dithiocarbamate.

As a general indication of the value of the process of the invention the following Table is presented.

|  | a | 1 | 2 | 3 | 4 |
|---|---|---|---|---|---|
| Dithiocarbamate | 206 | 24 | 11 | 6 | 2 |
| pH | 11.5 | 12.1 | 12 | 12 | 11.5 |
| $LC_{50}$ trout | 0.015 | 0.19 | 0.9 | 1.3 | 3.2 |
| $LC_{50}$ worms | 0.4 | 3.1 | 6.6 | 12 | 36 |

In the Table column (a) relates to a typical untreated effluent arising from manufacture of mixed dithiocarbamate products whilst columns 1 to 4 relate to similar effluents after treatment in accordance with the invention. The dithiocarbamate figures indicate the dithiocarbamate content (expressed as carbon disulphide) in parts per million, the figure in column (a) being for the untreated effluent whilst the figures in columns 1 to 4 are for the similar effluents after treatment. The pH figure in each case is that for the effluent before any treatment. The $LC_{50}$ figures are the results of toxicity tests on rainbow trout and lumbricillus rivalis. The toxicity figures quoted are the percentage concentrations of the effluent in standard hard water that produced mortality of 50% of the samples of test creatures in 48 hours.

Some specific examples of the process will now be given. In these the figures for dissolved dithiocarbamate content all relate to the amount of carbon disulphide equivalent to the dithiocarbamate. In each case, after the precipitation, 1 – 2 p.p.m. of a polyacrylamide flocculating agent was added, as an aqueous solution to assist separation of the precipitate from the treated effluent.

EXAMPLE 1

A sample of a 750 gallon batch of liquid effluent from plant manufacturing dithiocarbamates was analysed and found to contain 406 p.p.m. of dissolved dithiocarbamate. The pH of the effluent was found to be 10.0. The batch of effluent was fed to a tank, adjusted to a pH of 7.2 controlled addition with stirring of 20% w/v sulphuric acid (about 2.5 gallons) and 8 gallons of a 10% w/v solution of ferrous sulphate heptahydrate added. Mixing was aided by means of a stirrer. The mixture was allowed to stand for 2 hours and separation of the precipitate formed achieved by settlement. Analysis of the treated effluent showed that the dissolved dithiocarbamate content was 12 p.p.m. Another 750 gallon batch of the same effluent, having the same dissolved dithiocarbamate content and pH was treated in the same manner but using 38 gallons of a 20% w/v solution of cupric sulphate pentahydrate instead of the ferrous sulphate solution. The mixture was allowed to stand for 2 hours. In this case the treated effluent had a dissolved dithiocarbamate content of only 1 p.p.m.

EXAMPLE 2

Two 750 gallon batches of an effluent similar to that in Example 1 but having a dissolved dithiocarbamate content of 570 p.p.m. and a pH of 10.5 were treated in corresponding ways to those described in Example 1. In the first case the amount of the ferrous sulphate solution used was 11.2 gallons and in the second case the amount of the cupric sulphate solution used was 5.3 gallons. The two mixtures were each allowed to stand for 2 hours respectively. The ferrous sulphate treatment gave a final dissolved dithiocarbamate content of 6 p.p.m. whilst the cupric sulphate treatment gave a final dissolved dithiocarbamate content of 2 p.p.m.

A third batch (750 gallons) of the same effluent was subjected to an initial treatment as described above with 7.8 gallons of the ferrous sulphate solution but after the mixture had been allowed to stand for 2 hours the cupric sulphate solution was added in an amount of 0.4 gallons and the mixture then allowed to stand for 2 hours before filtration. In this case the treated effluent had a dissolved dithiocarbamate content of 1 p.p.m.

EXAMPLE 3

Three batches, each of 750 gallons of a further similar effluent to that treated in Examples 1 and 2 but having a dissolved dithiocarbamate content of 1,200 p.p.m. and a pH of 10.7 were treated in analogous ways to those described in Example 2. In the ferrous sulphate treatment 23 gallons of the ferrous sulphate solution were used, the mixture was allowed to stand for 1.5 hours and the final dissolved dithiocarbamate content was 9 p.p.m. In the cupric sulphate treatment 11.2 gallons of the cupric sulphate solution were used, the mixture was allowed to stand for 1.5 hours and the final dissolved dithiocarbamate content was 1 p.p.m. In the combined ferrous sulphate/curpic sulphate treatment, 16.5 gallons and 0.85 gallons of the ferrous sulphate and cupric sulphate solutions were used respectively, the mixture was allowed to stand for 1 hour after addition of the ferrous sulphate and for 1 hour after the addition of the cupric sulphate and the final dissolved dithiocarbamate content was less than 1 p.p.m.

EXAMPLE 4

Effluent, found to have a dissolved dithiocarbamate content of 2,200 p.p.m. and a pH of 11.0, was fed at an average rate of 900 gallons/hour over 24 hours to an in-line reactor having a hold-up volume of 750 gallons, thereby giving a residence time of 0.84 hours.

The pH of the contents of the reactor was held within the limits of 7.1 to 7.3 by controlled acid/base addition and a 10% w/v aqueous solution of ferrous sulphate heptahydrate was fed to the reactor at a rate of 56 gallons/hour.

A polyacrylamide flocculating agent, as an aqueous solution, was continuously added in a concentration of 1 to 2 p.p.m. on the total volume to the discharge point from the reactor, after which the matter was fed to a 6000 gallon settling tank.

The dissolved dithiocarbamate content of the clear, settled liquid was monitored at 2 hour intervals and found to be in the range of 5 to 10 p.p.m.

We claim:

1. A process for purifying industrial effluent from a plant where dithiocarbamates are made or used and which contains at least 200 p.p.m. dissolved dithiocarbamate consisting essentially of, before discharging the effluent, adjusting the pH, if necessary to a pH of 6 to 8, mixing the effluent at a pH of 6 to 8 with an excess of up to 200% of the stoichiometric amount of at least one soluble heavy metal salt selected from the group consisting of iron and copper and thereby precipitating heavy metal dithiocarbamate, separating the precipitated heavy metal dithiocarbamate from the effluent, discharging the effluent and disposing of the said precipitate by dumping or incineration.

2. A process according to claim 1 in which the precipitation is effected by use of an iron salt followed by use of a copper salt.

3. A process according to claim 1 in which the precipitation is effected by use of an iron salt and a copper salt simultaneously.

4. A process according to claim 1 carried out continuously.

5. A process according to claim 4 in which the pH of the effluent to be treated is continuously or periodically measured and soluble base or acid added, if necessary, so as to maintain the pH within the specified range.

6. A process according to claim 4 in which the dissolved dithiocarbamate content of the effluent to be treated is continuously or periodically measured and the proportion of the soluble heavy metal salt used changed, if necessary, so as to be substantially constant in relation to the dissolved dithiocarbamate content.

7. A process according to claim 4 in which the dissolved dithiocarbamate content of the treated effluent is continuously or periodically measured and the proportion of soluble heavy metal salt used changed, if necessary, so as to yield treated effluent of substantially constant dissolved dithiocarbamate content.

8. A process according to claim 1 in which the effluent to which the soluble heavy metal salt is added has a pH of from 6.7 to 7.3.

9. A process according to claim 1 in which the heavy metal salt and the amount thereof is such that the effluent being discharged contains less than 12 p.p.m. dithiocarbamate.

10. A process according to claim 1 in which a copper salt is used as heavy metal salt at least at the final stage of precipitation.

11. A process according to claim 10 in which the amount of heavy metal salt is such that the effluent being discharged contains less than 2 p.p.m. dithiocarbamate.

12. A process according to claim 1 in which a small amount of high molecular weight polyelectrolyte flocculating agent is mixed into the effluent after the addition of the heavy metal salt and before the separation of the precipitate.

13. A process according to claim 12 in which the amount of the flocculating agent added was from 1 to 2 p.p.m. based on the effluent treated.

14. A process for purifying industrial effluent from a plant where dithiocarbamate is made or used and which contains at least 200 p.p.m. dissolved dithiocarbamate consisting essentially of, before discharging the effluent, adjusting the pH if necessary to a pH of 6 to 8, mixing the effluent at a pH of 6 to 8 with an excess of up to 200% of the stoichiometric amount of soluble iron and copper salts, either simultaneously or first with the iron salt and then with the copper salt, thereafter adding an aqueous solution of a high molecular weight polyacrylamide flocculating agent, and thereby precipitating iron and copper dithiocarbamates, separating the precipitated dithiocarbamates froms the effluent, discharging the effluent having a dithiocarbamate content of not more than 2 p.p.m., and incinerating the separated copper and iron dithiocarbamates.

15. A process according to claim 14 in which the amount of the flocculating agent added was from 1 to 2 p.p.m. based on the effluent treated.

* * * * *